Inventor:

United States Patent Office 3,168,196
Patented Feb. 2, 1965

3,168,196
ELECTRICAL MEASURING AND SORTING
APPARATUS
Karl Max Harder, Vaduz, Liechtenstein, assignor to
Eurotec Establishment, Vaduz, Liechtenstein
Filed Sept. 28, 1962, Ser. No. 226,878
Claims priority, application Austria, Oct. 5, 1961,
A 7,482
12 Claims. (Cl. 209—90)

This invention relates to a method of automatically determining the dimensions of test specimens by means of automatically acting measuring apparatus having measuring gaps defined by a measuring table and a sensing pin, and to apparatus for carrying out such methods. The invention relates particularly to methods and apparatus for the selective elimination of specimens, particularly of precision parts, which are outside an allowable tolerance range.

Methods of automatically measuring precision parts, particularly of separating the acceptable products from those having dimensions above or below an allowable tolerance range, are known per se. Apparatus suitable for carrying out such methods comprise generally a measuring table and an opposite sensing device; the measuring table and the sensing device are interconnected by a frame and are adjustable relative to the same; the measuring table and the sensing device form together with the frame the measuring gap. The sensing device consists of a sensing head, in which a sensing pin is longitudinally slidably guided parallel to the axis of the measuring head. The test specimens to be measured enter the area between the measuring table and the sensing pin and displace the sensing pin by an amount which is proportional to their dimensions. Depending on the precision required, the displacement of the sensing pin is transmitted mechanically or electrically, e.g., by capacitive or inductive coupling, to a suitable indicating device, from which the dimension of the specimen can be read. When it is desired not to determine the absolute dimensions of the specimen but to check whether the dimensions of the specimen are or are not within an allowable tolerance range, a certain deflection of the indicating device is set with the aid of a standard specimen and it is then checked whether the test specimens being measured are within the predetermined, allowable tolerance range, the limits of which have been set by mechanical or electrical means. Depending on whether the deflection of the instrument is within or above or below the predetermined limits, the specimen causing such deflection can be directed by suitable means into a channel for the acceptable products or into channels for oversize or undersize products.

Such measuring apparatus are mainly fully automatic in operation. As has already been indicated by way of example, the sensing device is then so designed that the position of the sensing pin relative to the measuring head causes an inductive or capacitive unbalancing of a measuring bridge to furnish a value which corresponds to the size of the test specimen; this value is indicated by an electrical measuring instrument. Electric stages (bistable multivibrators or flip-flop circuits, thyratrons or the like) are connected in parallel to the electrical measuring instrument and are adjusted to be triggered at values corresponding to the lower and upper limits of the tolerance range, respectively.

Before the measurement of the test specimen, both stages are in an initial condition. In accordance therewith a collecting channel for the test specimens being measured is connected to a guide channel for undersize test specimens. If the test specimen being measured is undersize, this connection will be maintained. On the other hand, if the test specimen is an acceptable product, one of the trigger stages will respond to switch suitable guides so as to connect the collecting channel to the acceptable products channel. Finally, if the size of the test specimen is above the allowable upper limit, the second trigger stage will also respond to move another guide into a position in which the collecting channel is connected to the guide channel for oversize test specimens.

Whereas measuring systems of the kind described are basically satisfactory in operation, they have the great disadvantage that falsifications of the measurement due to geometric changes of the preset gap between the measuring jaws will be introduced into the measurement. For this reason, test specimens having a size outside the tolerance range may also be sorted into the acceptable products channel, or test specimens within the acceptable range may be sorted out as rejects etc.

These changes of the measuring gap may easily be caused by temperature fluctuations, by the release of any internal mechanical stresses in the system, by shakes or vibrations transmitted to the measuring apparatus, or by a deposition of dirt on the measuring table. Whereas these detrimental influences may partly be avoided by a selection of suitable materials, air conditioning of and removal of dust from the measuring room and vibration-free mounting, such measures involve considerable costs and the compensation cannot be carried to such an extent that even smallest deviations from the initial setting of the measuring system will be reliably eliminated. Particularly in the case of narrow tolerances lying, e.g., with antifriction bearings at 1 micron or less, the maintenance of a constant measuring gap is one of the most difficult problems. In such cases, temperature variations of only one degree centigrade will be of substantial significance and the influence of even small layers of dirt can no longer be neglected with such measurements. Even higher requirements must be met, e.g., in the manufacture of electrical circuit components from semiconductors; in this case the maintenance of certain thicknesses of the layers of the semiconductor bodies is of special importance because the electrical behavior of such circuit components will highly depend on such thickness.

It is an object of the present invention to provide a method of automatically measuring specimens, which method is independent of the above-mentioned external disturbing influences without need for paying special attention to air conditioning, the selection of materials of particularly high quality or the like, furthermore, to provide an apparatus for carrying out such process.

Based on these considerations, a method of automatically determining the dimensions of test specimens and, if desired, making a selection according to standard size, oversize and undersize within preadjustable tolerance values, by means of automatically acting measuring apparatus comprising measuring gaps defined by measuring tables and sensing pins, is characterized according to the invention in that immediately before the determination of the size of the individual test specimens in one direction the standard width of the measuring gap in the same direction is determined and the size of the test specimen is determined only thereafter and in consideration of the standard width of the measuring gap. Even if the sensing pin has changed its position relative to the originally adjusted initial position in an increasing or decreasing sense, the size of the test specimen will always be correctly determined because the measured value is precisely corrected by the initially determined value thereof which was incorrect due to the change of the measuring gap so that all disturbing influences will be exactly and reliably eliminated.

The standard width of the measuring gap is suitably taken into consideration in such a manner that a corresponding value is determined before the measurement of the test specimen and is stored in a suitable storage device, whereafter the specimen itself is measured and the measured value of the specimen and the stored value are compared, the resulting difference being used to form the value indicating the measurement of the specimen.

In carrying out a method according to the invention, the sensing pin may be adjusted so that it is spaced apart from the measuring table by a distance which is somewhat smaller than the smallest allowable tolerance value of the specimen. This preliminary adjustment is recorded as a zero position. Then the allowable deviation of the dimensions of the test specimen from the nominal size, i.e., the limits of the tolerance range, are recorded, and a compensation value is formed, which corresponds to the value by which the sensing pin is closer to the measuring table than corresponds to the lower limiting value of the tolerance range or the allowable dimensions of the test specimen. The distance from the sensing pin to the measuring table must be kept below the distance corresponding to the lower limit of the tolerance range in order to ensure that the sensing pin will in any case be displaced when dimensions of the test specimen are just at the lower limit. On the other hand, the measure by which the sensing pin is closer to the measuring table would falsify the measurement so that when the result of the measurement is formed, the above-mentioned compensation value must be taken into account in forming the final result of measurement. The steps described are necessary preparatory steps, which are followed by the actual consecutive measurements. First, the position of the sensing pin is determined and recorded by being stored. Then the test specimen is fed to the apparatus whereby the sensing pin is displaced in a certain relation to the size of the test specimen. The displacement of the sensing pin is measured. The value corresponding to the position of the sensing pin before the measurement and the value corresponding to the position of the sensing pin after the measurement are then compared, with consideration being given to the compensation value, the resulting difference is fed to a discriminator, which then decides whether the test specimen is within, or below or above the tolerance range.

Instead of setting only once the distance of the sensing pin from the measuring table and relating the consecutive measurements to this setting, it is possible, in a modification of the invention, to introduce a standard specimen having the nominal dimension between the sensing pin and the measuring table before each measurement of a test specimen so that the sensing pin is always moved anew to the position for measurement; in this case, the zero position is determined by the distance which results from the dimension of the test specimen, and is stored, whereas the compensation value is set in accordance with the difference between the known measure of the standard specimen and the lower allowable limit of the tolerance range.

In a somewhat modified method according to the invention, which is also particularly directed to the selection of test specimens outside an allowable tolerance range, the sensing pin is directly placed on the measuring table; this position is recorded as a zero position; then the sensing pin is moved by means of a standard specimen from the measuring table by a distance which is somewhat smaller than the smallest allowable size of a test specimen and this position of the sensing pin is set as a reference value; these are again preparatory steps, which are followed by the actual consecutive measurements. In the latter, any deviations of the sensing pin from the zero position are determined and stored before the measurement of the test specimen, then the sensing pin is lifted and the test specimen is introduced, the position of the sensing pin during the measurement of the test specimen is compared with the reference position to obtain a value which corresponds to the dimensions of the test specimen, the difference between this value and that corresponding to the position of the sensing pin immediately before the measurement is determined and is fed to a discriminator. In this method, it is not necessary to form a compensation value.

An apparatus for carrying out methods according to the invention, comprising a measuring table adjustably mounted at one end of a measuring frame, at the other end of which a measuring head is slidably held and can be fixed in a desired position, which measuring head accommodates coils in the openings of which a portion consisting of a magnetic core, particularly a Ferroxcube (registered trademark) core, of a sensing pin is longitudinally slidably guided, furthermore, a feeder plate for feeding the test specimens into the measuring gap defined by the sensing pin and the measuring table, and guide channels for the measured test specimens, furthermore, an electric circuit for evaluating the results of measurement, has, according to the invention, the following features:

The sensing pin has attached to it an L-shaped arm or sensing member, which is adjustable parallel to the longitudinal axis of the pin and which has cupped or rounded surface adapted to rest on the surface of the measuring table. The electric circuit comprises a first capacitor for storing an electrical value which corresponds to the position of the sensing pin relative to the sensing head and which is obtained by unbalancing an A.C.-fed compensating bridge as a result of a displacement of the magnetic core. The electric circuit includes further a second capacitor for storing a value which corresponds to the dimension of the test specimen and which is also formed by unbalancing the compensating bridge as a result of a displacement of the magnetic core proportional to the dimension of the test specimen. The feeder plate for feeding the test specimens into the measuring gap reciprocates and by this reciprocation operates switches, by the first of which, before the feeding of the test specimen into the measuring area, the output voltage of the measuring bridge is applied to the first capacitor serving for storing the value corresponding to the position of the sensing pin before the measurement whereas a switch is changed over at the beginning of the measurement of the test specimen to disconnect this capacitor from the output voltage and to apply the output voltage of the bridge at the beginning and during the measurement of the test specimen to the second capacitor serving for storing the value corresponding to the position of the sensing pin according to the dimension of the test specimen. Finally, the connection between the output voltage of the bridge and said two capacitors is disrupted immediately after the termination of the measurement of the test specimen and at the same time said two capacitors are connected by a third switch in series with a third capacitor, which supplies the compensation voltage required for the correct measurement, and are connected to an amplifier fed with the algebraic sum of the three capacitor voltages, which sum corresponds exactly to the value of the dimensions of the test specimen. The output of this amplifier is coupled to the inputs of discriminator stages, which are connected to circuit components for controlling movable routing guides for routing the test specimen into the proper channels depending on the tolerance position.

The described apparatus can be modified so that the sensing pin is not held by said L-shaped sensing member at a predetermined distance from the measuring table but has a collar, which rests on the measuring table, whereas the front end of the feeder plate has connected to it by an elastic member a support in which a standard specimen is rotatably mounted, which is introduced between the measuring table and sensing pin before each measurement to set the required distance from the measuring table.

An apparatus according to the invention which regarding its mechanical structure has the same basic elements as that described hereinbefore may be modified in that the sensing pin rests on the measuring table until immediately before the measurement and is then displaced by a lifting member, which is lifted by the movement of the feeder plate toward the measuring area, the displacement being sufficient to permit the test specimen to be introduced between the sensing pin and the measuring table. The measuring head, however, accommodates two superimposed pairs of coils, each of which pairs forms in conjunction with further coils a compensation bridge so that the electric circuit includes first and second bridges. Before the beginning of the measurement, the first bridge is first connected to an A.C. generator by a switch depending in position on the position of the feeder plate whereas the second bridge remains deenergized during this time. The first bridge has connected to its output by means of an amplifier a first capacitor, which stores the output voltage resulting from the unbalance of the bridge. When the sensing pin has been lifted by the lifting member shortly before the measurement of the test specimen and during the measurement of the test specimen, the first bridge is disconnected from the A.C. generator and the second bridge is connected to the A.C. generator. By a switch controlled by the movement of the feeder plate, the output of the first bridge is disconnected from said amplifier whereas the output of the second bridge is coupled to the input of the amplifier. At this time, a further switch is in a position in which the first capacitor is disconnected from the voltage supply but remains charged at the stored value whereas a second capacitor is being charged to the amplifier output voltage of the second bridge. Finally, both capacitors are connected in series and to the input of a further amplifier immediately after the termination of the measurement by switches which are also controlled by the position of the feeder plate and the output of said further amplifier feeds discriminator stages, which control the position of movable routing guides by means of suitable switching elements. As contrasted with the previously described apparatus, a third capacitor for supplying a compensation voltage is not required here.

The circuit of the measuring apparatus incorporates suitably a further switch, which can be closed by hand to apply the respective output voltage of the bridge directly, without interposition of the capacitors, to the amplifier having the discriminator stages connected to its output so that the discriminator stages can be conveniently set to the allowable limiting values.

The discriminator stages may comprise flip-flop stages, the inputs of which are connected by voltage dividers to the output of the amplifier so that the response threshold values of the flip-flop stages can be set in a particularly simple manner. The inputs of the flip-flop stages may also be connected to one terminal of a switch, which is closed during the return movement of the feeder plate to connect the inputs of the flip-flop stages to ground or to another definite potential so that the flip-flops are restored to their initial condition.

Some apparatus suitable for carrying out the methods according to the invention will be described hereinafter by way of example with reference to the accompanying drawing.

Figure 1:
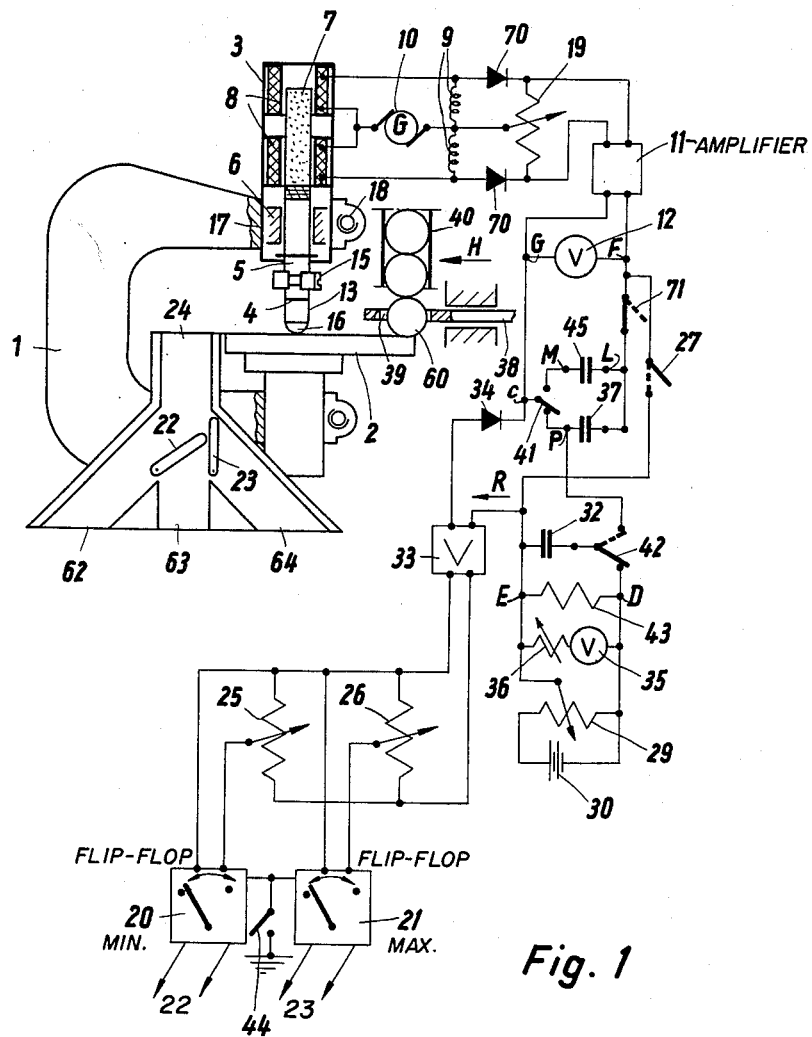
FIG. 1 shows a measuring apparatus in which the distance of the sensing pin from the measuring table is determined by a stirrup-shaped sensing member and which comprises in its measuring head only a single pair of coils; the sensing pin is in the position which corresponds to the condition of the measuring apparatus before the beginning of the measurement.

In FIG. 1, 1 is the measuring frame, which has adjustably mounted thereon at one end the measuring table 2 and at the other end in a guide 17 the measuring head 3. The sensing pin 5 is longitudinally slidably guided in the measuring head 3 and is terminated at its lower end by the sensing surface 4. The upper portion of the sensing pin 5 consists of a core of high-grade magnetic material, particularly of magnetic material known under the registered trademark Ferroxcube. This core 7 is slidingly supported through the pin 5 in a guide 6 and slides in openings of the pair of coils 8, which together with the coils 9 form an electric compensation bridge fed by an A.C. generator 10. A magazine 40 holds the test specimens 60 to be measured. The magazine 40 is so arranged above the measuring table 2 that a feeder plate 38, which is horizontally movable between the magazine 40 and the measuring table 2, can receive in a slot 39 the test specimens 60 discharged from the magazine 40, and by a movement in the direction of the arrow H can feed them into the measuring area between the sensing pin 5 and the measuring table 2. The measuring table 2 has connected to it at the end opposite to the magazine a collecting channel 24, which branches into three further channels, namely, an acceptable products channel 63, an oversize products channel 62 and an undersize products channel 64. The collecting channel 24 communicates only with one of the three branch channels 62, 63, 64 at a time because the movable routing gates 22, 23 provide for a passage to only one of the three branch channels at a time.

A voltage divider 19 is connected at its ends via rectifiers 70 to the junctions between coils 9 and coils 8. The tap of the voltage divider is connected to the junction between the two coils 9. The two extremities of the voltage divider 19 are also connected to an amplifier 11, the output of which has the terminals F and G of an indicating instrument 12 connected to it. Capacitors 45 and 37 are connected on one side in parallel to terminal F of the indicating instrument 12 by a switch 71. By means of a switch 41, either one of these capacitors can be connected at the other side to point C. Only when the switch 27 is closed is an amplifier 33 connected in parallel with the indicating instrument 12. The output of the amplifier 33 is connected via voltage dividers 25 and 26 to the inputs of flip-flop stages 20, 21, the outputs of which are connected to switching elements suitable for operating the movable routing gates 22, 23.

The electric circuit includes further an electric compensation network. A voltage source 30 feeds via the tap of a voltage divider 29 a capacitor 32, which is connected therewith by the change-over switch 42; a resistor 43 and an indicating instrument 35 with a series rheostat 36 are connected in parallel to the capacitor 32. By throwing over the switch 42, the capacitor 32 charged by the voltage source 30 can be connected to the terminal P of the capacitor 37 whereas the other terminal of capacitor 32 is permanently connected to one input terminal of the amplifier 33.

Figures 2, 4:
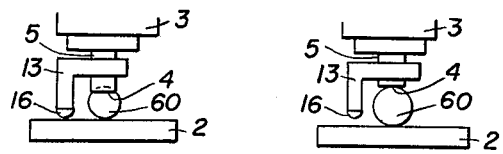
FIG. 2 is a side elevation showing the measuring table and the sensing pin with the L-shaped sensing member.
FIG. 4 is a side elevation showing the sensing pin and measuring table during the measurement of the test specimen.

The mode of operation of the measuring apparatus is as follows: Before the beginning of the measurement, the rounded end portion 16 of the L-shaped sensing member 13 rests on the measuring table 2 (FIGS. 1 and 2). The distance of the tip of portion 16 from the sensing surface 4 of the sensing pin 5 is adjusted by means of the screw 15 so that it is somewhat less than the lowest allowable dimension to be measured of a test specimen (FIG. 2). With the tightening screw 18 loosened, the measuring head 3 is then displaced in its guide 17 in the measuring frame 1 until the indicating device 12 shows a zero reading. The scale of the indicating device 12 may have eleven evenly spaced division lines so that there are ten fields between the division lines. The first division line disposed at the left-hand end of the scale corresponds to the zero position.

When the measuring head is in the position in which the pointer of the indicating instrument 12 is in registry with the first division line, the tightening screw 18 is tightened to fix the position of the sensing head 3 relative to the measuring frame 1. A fine adjustment of the zero position may be effected by an adjustment of the voltage divider 19.

As has been stated hereinbefore, the scale of the indicating instrument 12 should be divided into ten equal fields; each two adjacent division lines should be spaced apart by the unit distance Y and the allowable deviation of the test specimens from the nominal size should correspond to ±5Y. In this case, the first division line of the scale corresponds to the lower limit value and the last, i.e., the eleventh division line, corresponds to the upper limit value of the dimensions of the test specimens.

To ensure that the test specimens are correctly sorted, the response threshold values of the flip-flop circuits 20, 21 must be adjusted to conform to the electrical values which correspond to the positions of the pointer of the indicating instrument 12 coinciding with the first and last division lines, respectively. For this purpose, the manual switch 27 is closed so that the voltage applied to the indicating instrument 12 is directly connected by the voltage dividers 25, 26 and the amplifier 33 to the inputs of the flip-flop stages 20, 21. The slider of the voltage divider 19 is already in a position which corresponds to the lower limit value of the tolerance range so that with this setting of the voltage divider 19 the response threshold value of the flip-flop 20 can be determined in known manner by the voltage divider 25. The voltage divider 19 must then be adjusted so that the pointer of the indicating device 12 is in registry with the eleventh division line to indicate that the voltage applied to the indicating instrument corresponds to the upper allowable limiting value of a test specimen dimension. In accordance with this measuring voltage, the response threshold value of the second flip-flop 21 is determined by means of the voltage divider 26. Then the voltage divider 19 is turned back until the pointer of the indicating device 12 is again in its zero position.

The actual measurement cannot yet be begun, however, because the reference value for the electric circuit which corresponds to the distance between the measuring table 2 and the sensing pin surface 4 is not yet known. For this reason, a standard specimen having an exactly known dimension is introduced into the measuring gap. The size of the standard specimen may exceed the lower limit value of the tolerance range, e.g., by 3Y. The instrument 12 may be assumed to show a reading corresponding to 6.5Y. This means that the surface 4 of the sensing pin is closer to the measuring table by a value 3.5Y than corresponds to the lower limit value of the tolerance range. In order to obtain correct measurements, the final result of measurement must be obtained with the aid of a compensation voltage proportionate to the difference by which the sensing pin is too close to the measuring table, in the assumed case 3.5Y. The capacitor 32 is charged to this value. It is fed by the source 30, which applies to the capacitor 32 an output voltage which is adjustable in fractions by the voltage divider 29. The value of the voltage applied to the capacitor 32 can be read from an instrument 35, which is adjusted by the series rheostat 36 so that deflections of the pointer of this indicating instrument 35 are equal to corresponding deflections of the indicating device 12. In the case assumed, the voltage divider 29 should be adjusted so that the instrument 35 gives a reading corresponding to a value of 3.5Y.

After these preparations, the actual measurement, which is automatically performed, may begin. The feeder plate 38 receives in its slot 39 successive test specimens 60 from the magazine 40 and feeds each of them to the measuring area in the direction of the arrow H. The switches 71, 41 and 42 are coupled to the feeder plate 38. Before the test specimen 60 reaches the measuring area, the switch 71 is closed and the switch 41 is set to connect point C with the terminal P so that the capacitor 37 is connected to the output of the amplifier 11. As long as the measuring gap has not been changed by disturbing influences, the output voltage of the bridge 8, 8, 9, 9 will remain zero so that the capacitor 37 is not charged. If the setting of the sensing pin 5 has changed from the original setting, the bridge 8, 8, 9, 9 will be unbalanced and the resulting voltage will be stored by the capacitor 37.

Figure 3:
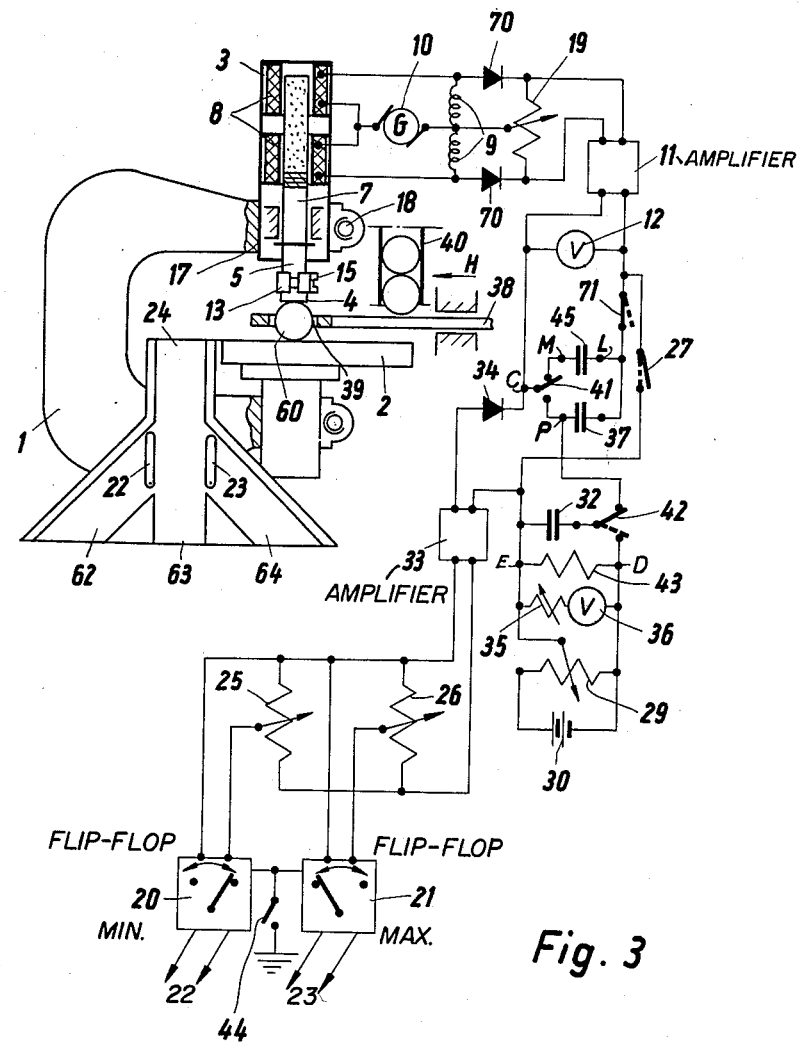
FIG. 3 shows the measuring apparatus of FIG. 1 during the measurement of the test specimen.

During the forward movement of the feeder plate 38, the switch 41 is switched over before the test specimen 60 has reached the measuring gap. As a result, the capacitor 37 is disconnected from and the capacitor 45 is connected to the measuring circuit. When the test specimen has entered the area between the sensing pin surface 4 and the measuring table 2, the sensing pin 5 will be lifted (FIGS. 3 and 4) to unbalance the bridge 8, 8, 9, 9, which now applies to the capacitor 45 a voltage corresponding to the displacement of the sensing pin 5.

As soon as the test specimen 60 has left the measuring area in the direction toward the collecting channel 24 after the measurement has been performed, the switch 71 controlled by the movement of the feeder plate 38 is opened and the switch 42 is moved to establish connection with the terminal P of the capacitor 37. As a result, the capacitors 37, 45, having equal capacitances, and the capacitor 32, having a much higher capacitance than the capacitors 37, 45, are connected in series and the two terminals of this series circuit are connected to the input of the amplifier 33, the input of which is thus fed with the algebraic sum of the partial voltages of these three capacitors.

In this way, a differential voltage is obtained which corresponds exactly to the measured value of the test specimen 60 whereas disturbing influences are entirely eliminated. After amplification by the amplifier 33, this voltage determines the further behavior of the flip-flop stages 20 and 21.

Whereas the voltages of the capacitors 32, 37, 45 are instantaneous values, this fact is not significant in the present case because it is sufficient for triggering the flip-flop stages when the maximum value required has been present once for a short time. This will cause a response of one of the flip-flop stages; the further condition of this stage is independent of the subsequent value of the input voltage of the amplifier 33.

When the measured test specimen has reached the collecting channel 24, the feeder plate 38 returns to its initial position. During this movement, the feeder plate temporarily closes a switch 44, whereby the flip-flop inputs are connected to the ground potential or another suitable potential so that they are restored to their initial condition. When the feeder plate 38 has finally reached its rear end position, the switches 71, 41 and 42 will also have returned to their initial position. The energy received by the capacitor 37 during the measuring operation can now be discharged via the indicating instrument 12 and the output resistor of the amplifier 11. Likewise, the capacitor 32 is again charged to the compensation voltage between terminals D and E.

Now the case will be considered in which the measuring area is entered by a test specimen which is sufficiently large to lift the sensing pin but which has a size below the allowable limiting value. The lifting movement of the sensing pin caused by such a test specimen 60 may be assumed to correspond to a value of 2Y. Whereas this would render the terminal L of the capacitor 45 again positive and, if the deviation of the sensing pin 5 from its correct position is only small, the sum voltage of the capacitors 37 and 45 might be positive, this voltage cannot act alone on the inputs of the amplifier but only through the intermediary of the capacitor 32, which is charged to the value 3.5Y. For this reason, in spite of the positive charge at the terminal L of the capacitor 45, a negative resultant voltage is obtained. This negative voltage cannot cause a current to flow in the circuit including the capacitors 32, 37, 45 because this circuit includes also the diode 34, which permits only of a current flow in the direction of the arrow R. A test specimen having the assumed dimensions would thus be correctly guided into the channel 64 for undersize test specimens because neither of flip-flop stages 20, 21 can respond to change the position of the movable routing gates 22, 23.

It may be mentioned that the diode 34 is only a safety feature. The amplifier 33 would not be able to supply a voltage sufficient for the operation of a flip-flop stage in the case of a current flow in a direction opposite to the arrow R. Hence, a test specimen cannot enter the acceptable products channel unless its diameter corresponds at least to the lower limit of the tolerance range and does not exceed the upper limiting value.

Figure 6:
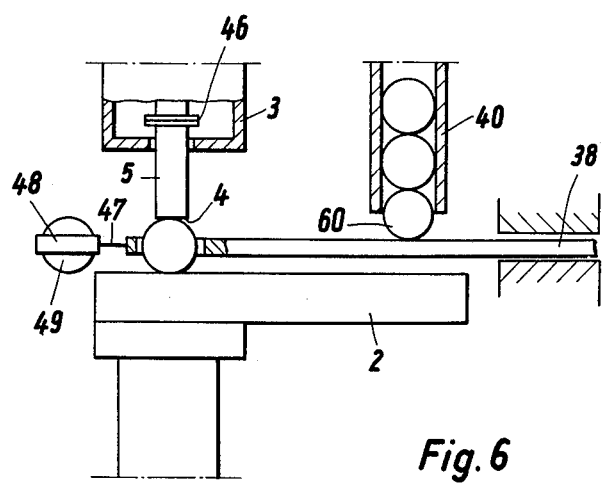
FIG. 6 shows the same arrangement during the measurement of the test specimen.
Figure 5:
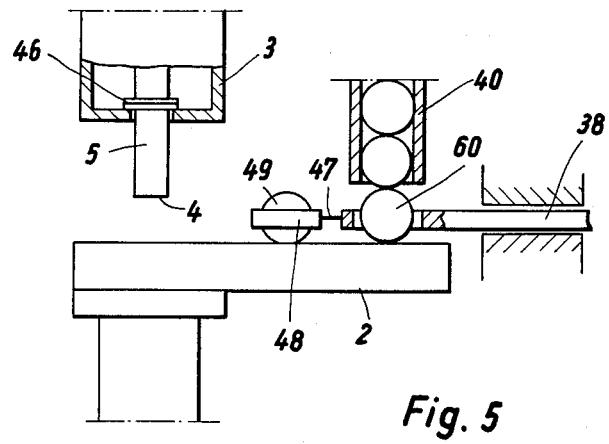
FIG. 5 shows a feeder plate with a standard specimen at its front end in the position before the beginning of the measurement.

FIGS. 5 and 6 show an embodiment which differs from the previously described measuring system in that the distance of the sensing pin 5 from the measuring table 2 is not determined by an L-shaped sensing member 13 but the sensing pin 5 has a collar 46 which in its lowest position abuts against the bottom of the measuring head 3. The distance between the sensing surface 4 and the measuring table 2, however, is so large that the fed test specimens 60 can enter the measuring area. The position in which the collar of the sensing pin rests on the bottom of the measuring head is inherently insignificant for the measurement. Before each measurement of a test specimen 60, the standard specimen 49 of exactly known size is introduced between the sensing pin surface 4 and the measuring table 2 by means of holder 48 carrying the standard specimen 49, preferably in a rotatable manner, and attached by a resilient link 47 to the forward end of the feeder plate 38.

The mode of operation of this apparatus is basically the same as that of the previously described measuring system. The zero position is determined when the standard specimen has been inserted between the sensing pin surface 4 and the measuring table 2. This zero position is redetermined practically before each measurement by the insertion of the standard specimen 49. As in the apparatus described hereinbefore, any changes in the position of the sensing pin, caused by external disturbing influences, relative to the initially fixed zero position will cause the bridge 8, 8, 9, 9 to be unbalanced and will be stored in the form of an analog value by the capacitor 37. Based on the known difference between the dimension of the standard specimen and the allowable limits of the tolerance range, the compensation voltage can then be determined by an adjustment of the voltage divider 29. Because the standard specimen 49 is subject to a certain wear, it may have to be replaced from time to time.

Figure 7:
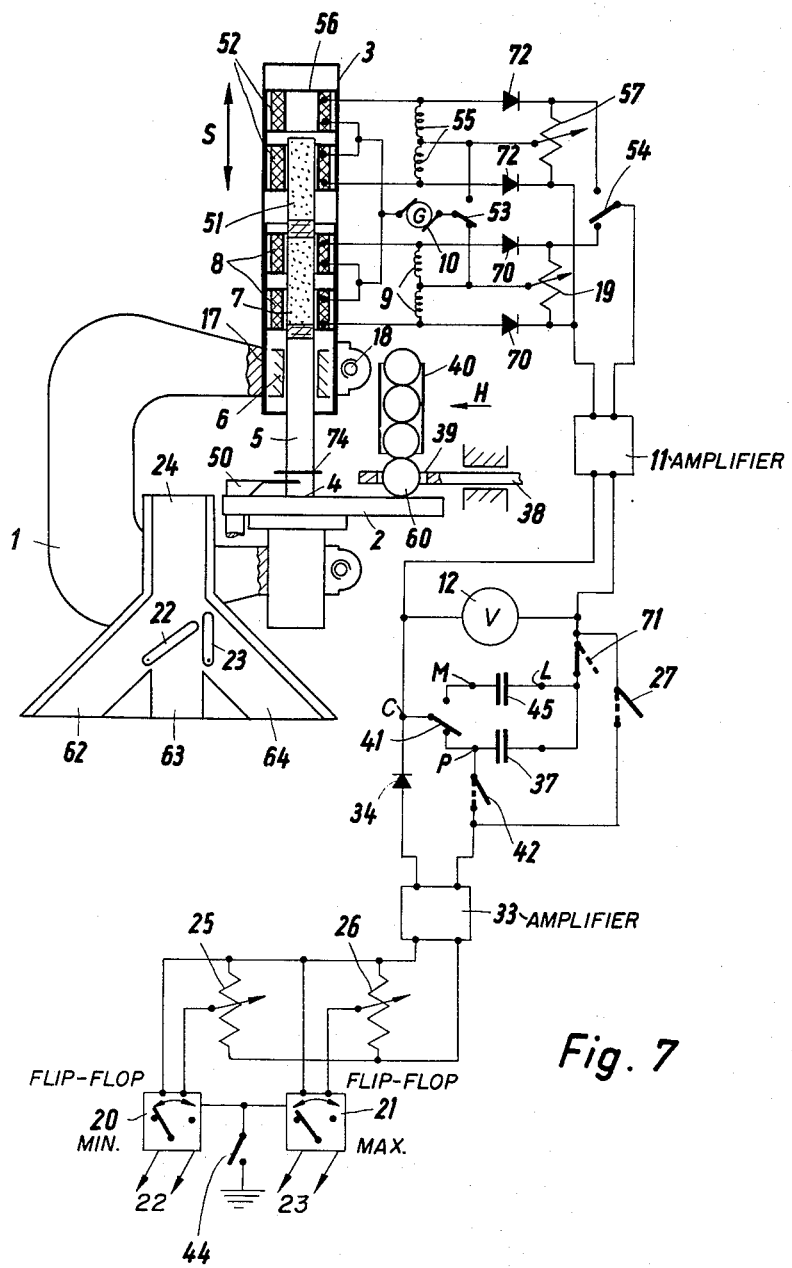
FIG. 7 shows another embodiment in the condition before the measurement. In this embodiment, the sensing pin rests directly on the measuring table and the measuring head is provided with two pairs of coils.
Figure 8:
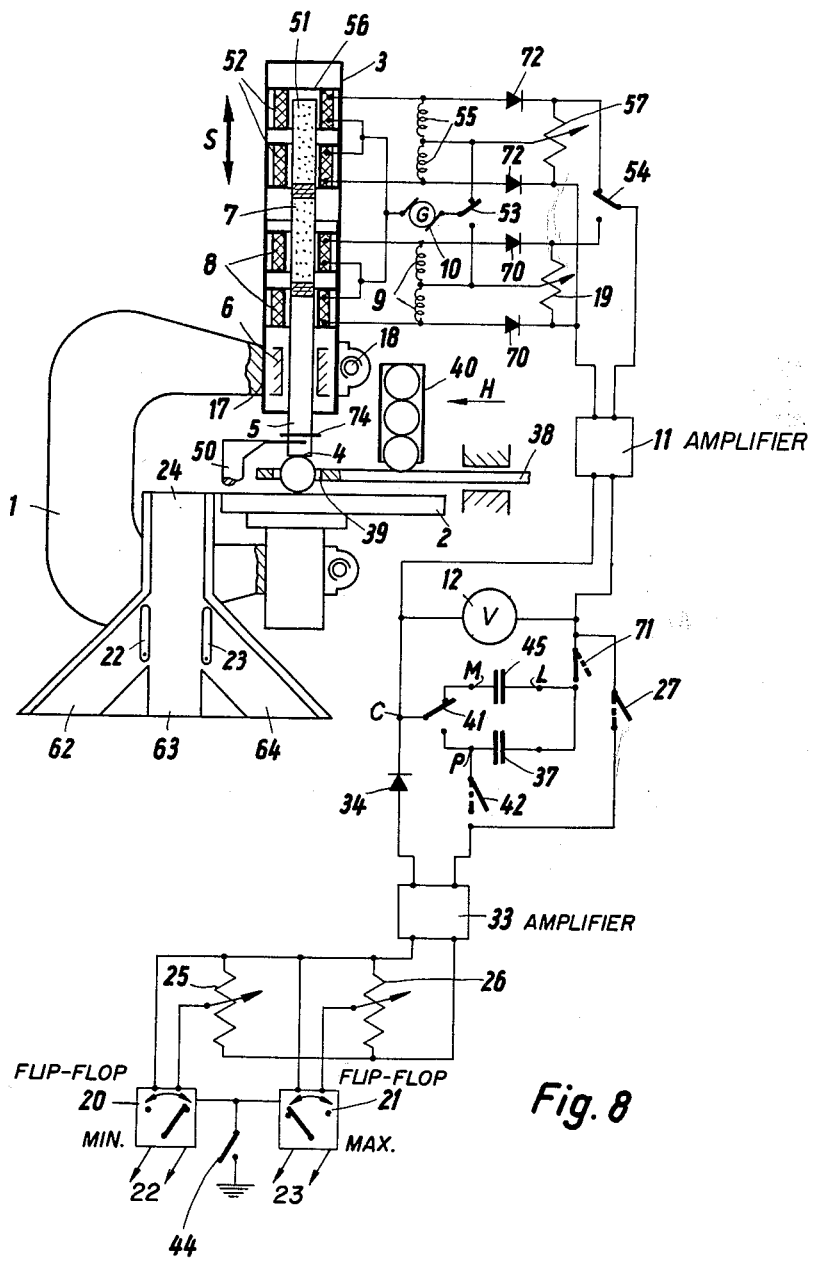
FIG. 8 shows the same arrangement during the measurement of a test specimen, with the several electric switches in other positions than in FIG. 7.

FIGS. 7 and 8 show another illustrative embodiment of a measuring arrangement according to the invention. This embodiment differs in some respects from the embodiments shown in FIGS. 1 to 4 and 5, 6. In this case, the sensing pin 5 is not always held a certain distance apart from the measuring table 2 but abuts normally with its sensing surface 4 directly against the measuring table 2. To provide a gap having a width sufficient for the introduction of a test specimen 60 between the sensing pin 5 and the measuring table 2, a lifter 50 is provided, which is mechanically coupled to the feeder plate 38 and during the forward movement of the latter is lifted to move the sensing pin 5 by means of a collar 74 to the required level.

Because the height differences involved in this lifting movement are so large that the unbalance cannot be accommodated in a single bridge system, the measuring head 3 accommodates in addition to the above-mentioned coils 8, 8 further coils 52, 52, which together with the coils 55, 55 form a second bridge system and in the openings of which a further portion of the sensing pin 5 is slidable; this further portion of the sensing pin consists of a magnetic core 51. In dependence on the position of the feeder plate 38, one bridge system or the other can be connected by means of a switch 53 to the A.C. generator 10. At the same time, the outputs of one bridge can be connected by means of a switch 54 to the input of an amplifier 11. That portion of the electric circuit which follows the output of the amplifier 11 is analogous to the corresponding circuit portion described with reference to FIGS. 1 to 4, whereas the compensation network, which is not required in the embodiment according to FIGS. 7 and 8, is omitted.

The measurement and the preparations required for it are performed as follows: The sensing pin 5 rests initially with its sensing surface 4 on the measuring table 2 (see FIG. 7). In this position of the measuring apparatus, the switch 53 connects the bridge 8, 8, 9, 9 to the generator 10. The zero position is determined in known manner with the aid of the indicating instrument 12 by the adjustment of the measuring head 3. An additional fine adjustment of this setting may be effected by means of the voltage divider 19, if desired. A standard specimen is then introduced between the sensing pins and the measuring table. This causes the switches 53 and 54 to assume the positions shown in FIG. 8. Thereafter, the housing 56 with the coils 52 is adjusted in the direction of the arrow S until the indicating device 12 gives a reading which corresponds to the difference between the dimension of the standard specimen and the allowable tolerance limits. By means of the voltage divider 57 connected via the diodes 72 to the output of the bridge 52, 52, 55, 55, a fine adjustment of the effect of this setting can also be carried out. Finally, the flip-flop stages 20, 21 are again adjusted to the required response threshold values, with the switch 27 being closed. After these preparations the actual measurement can begin. Because in the position of the sensing pin 5 shown in FIG. 7 the switch 41 applies the output voltage of the bridge 8, 8, 9, 9 to the terminal P of the capacitor 37, any change of the measuring gap from the originally determined condition will cause this capacitor to be charged to a voltage value which corresponds to this change and results from an unbalance of the bridge due to a displacement of the magnetic core 7. Such a change of the measuring gap will generally occur only after a prolonged measuring time, not immediately after the setting of the zero position. The feeder plate 38 is then moved in the direction of the arrow H toward the measuring gap and shortly before the test specimen reaches the measuring area, the sensing pin 5 is sufficiently lifted by the lifting member 50 to permit the test specimen 60 to enter the area between the sensing pin 5 and the measuring table 2. During this feed movement of the feeder plate 38, the switch 53 has been thrown over into the position shown in FIG. 8, just as the switches 54, 41. The compensation bridge 52, 52, 55, 55 is thus energized to supply at its output terminals a voltage corresponding to the dimensions of the test specimen 60 via an amplifier 11 to the capacitor 45.

When the measurement has been performed, the feeder plate 38 continues to move in the same direction until the test specimen 60 arrives over the collecting channel 24 and drops into the same. Depending on the position of the movable routing gates 22, 23, the test specimen enters one of the branch channels 62, 63, 64. During this continued movement of the feeder plate 38, the latter closes the switch 42 and opens the switch 71 immediately after the test specimen 60 has left the measuring area; the capacitors 45, 37 are then connected in series and their terminals M and P are connected to the input of the amplifier 33 to feed the same with their differential voltage, i.e., the algebraic sum of the partial voltages; this differential voltage corresponds to the actual size of the test specimen 60 and after any disturbing influences have been eliminated therefrom. The further control of the flip-flop stages 20, 21 and of the movable routing gates 22, 23 is then effected as described.

During the return movement of the feeder plate 38, the switch 44 is closed for a short time in order to ground the inputs of both flip-flops 20, 21 so that the same are restored to their initial condition. During the return movement of the feeder plate 38, the switches 53, 54, 41, 42 and 71 have assumed the position shown in solid lines in FIG. 7 so that a new measuring cycle can be performed.

What is claimed is:

1. Electrical measuring apparatus for calipering and sorting work pieces according to size, comprising, in combination, measuring frame means including a measuring table; measuring head means carried by said frame means opposite said measuring table and comprising sensing pin means slidable longitudinally along a predetermined path in said head means substantially perpendicularly relative to said measuring table and including at least one portion constituting a magnetic core, at least one first pair of induction coils aligned with each other in said head means and surrounding said path of said magnetic core portion, at least one second pair of induction coils separate from said first pair of coils and connected therewith to constitute a compensation bridge circuit, and an alternating voltage generator means for feeding said bridge circuit and for producing at the terminals thereof an output voltage when said bridge circuit is in unbalanced condition due to a movement of said sensing pin means relative to said first pair of coils, said output voltage being an analog value of the magnitude of such movement out of a chosen reference position in which said bridge circuit is balanced; electric circuit means connected to said terminals and comprising first capacitor means for storing a first analog value of said output voltage corresponding to a chosen starting position of said sensing pin means and to a corresponding unbalance of said bridge circuit, second capacitor means for storing a second analog value of said output voltage corresponding to a displaced position of said sensing pin means caused by placing a work piece between said measuring table and said sensing pin means, third capacitor means for storing a third fixed analog value of said output voltage corresponding to a chosen reference position of said sensing pin means and corresponding to a lower tolerance limit dimension of said work piece, first switch means for connecting said first capacitor means with said compensation bridge terminals when said sensing pin means is in said starting position, second switch means for connecting said second capacitor means with said comepnsation bridge terminals when a work piece is in measuring position between said measuring table and said sensing pin means, and third switch means movable between a first position in which it connects said third capacitor means with an electric voltage source, control means being provided for adjusting the output voltage of said source so as to correspond as an analog value to a position of said sensing pin means corresponding to a chosen lower tolerance limit dimension of the work pieces to be measured, and a second position in which said third switch means connects said first, second and third capacitor means as a series-combination with each other so as to enable said series-combination to discharge a final output voltage which is the algebraic sum of the individual voltages stored in said first, second and third capacitor means and corresponds to the measured size of the particular work piece; and sorting means for sorting a plurality of successively measured work pieces according to size and comprising discriminator circiut means connected to said electric circuit means for being supplied with said final output voltage, sorting channels emanating from said measuring table and respectively assigned to piece sizes within, above and below a chosen tolerance range and electrically controllable gate means arranged across said channels and controlled by said discriminator circuit means in such a manner that after each measuring operation resulting in an energization of said discriminator circuit means by a final output voltage corresponding to a measured size of a particular work piece said gate means are so actuated that said particular measured workpiece is permitted to enter only that one sorting channel which is assigned to receiving work pieces with a size corresponding to the magnitude of said final output voltage which actuates the respective gate means.

2. Electrical measuring apparatus for calipering and sorting work pieces according to size, comprising, in combination, measuring frame means including a measuring table and feeder means for feeding work pieces individually from a standby position into a measuring position and from the latter position into a delivery position; measuring head means carried by said frame means opposite said measuring table and comprising sensing pin means slidable longitudinally along a predetermined path in said head means substantially perpendicularly relative to said measuring table and including at least one portion constituting a magnetic core, at least one first pair of induction coils aligned with each other in said head means and surrounding said path of said magnetic core portion, at least one second pair of induction coils separate from said first pair of coils and connected therewith to constitute a compensation bridge circuit, and an alternating voltage generator means for feeding said bridge circuit and for producing at the terminals thereof an output voltage when said bridge circuit is in unbalanced condition due to a movement of said sensing pin means relative to said first pair of coils, said output voltage being an analog value of the magnitude of such movement out of a chosen reference position in which said bridge circuit is balanced; electric circuit means connected to said terminals and comprising first capacitor means for storing a first analog value of said output voltage corresponding to a chosen starting position of said sensing pin means and to a corresponding unbalance of said bridge circuit, second capacitor means for storing a second analog value of said output voltage corresponding to a displaced position of said sensing pin means caused by placing a work piece between said measuring table and said sensing pin means, third capacitor means for storing a third fixed analog value of said output voltage corresponding to a chosen reference position of said sensing pin means and corresponding to a lower tolerance limit dimension of said work piece, first switch means for connecting said first capacitor means with said compensation bridge terminals when said sensing pin means is in said starting position, second switch means for connecting said second capacitor means with said compensation bridge terminals when a work piece is in measuring position between said measuring table and said sensing pin means, and third switch means movable between a first position in which it connects said third capacitor means with an electric voltage source, control means being provided for adjusting the output voltage of said source so as to correspond as an analog value to a position of said sensing pin means corresponding to a chosen lower tolerance limit dimension of the work pieces to be measured, and a second position in which said third switch means connects said first, second and third capacitor means as a series-combination with each other so as to enable said series-combination to discharge a final output voltage which is the algebraic sum of the individual voltages stored in said first, second and third capacitor means and corresponds to the measured size of the particular work piece, said first, second and third switch means being operatively connected with said feeder means for being actuated thereby depending upon the movement thereof between said positions; and sorting means for sorting a plurality of successively measured work pieces according to size and comprising discriminator circuit means connected to said electric ciruit means for being supplied with said final output voltage, sorting channels emanating from said measuring table and respectively assigned to piece sizes within, above and below a chosen tolerance range and electrically controllable gate means arranged across said channels and controlled by said discriminator circuit means in such a manner that after each measuring operation resulting in an energization of said discriminator circuit means by a final output voltage corresponding to a measured size of a particular work piece said gate means are so actuated that said particular measured work piece is permitted to enter only that one sorting channel which is assigned to receiving work pieces with a size corresponding to the magnitude of said final output voltage which actuates the respective gate means.

3. An apparatus according to claim 2, wherein said feeder means include a feeder plate reciprocatingly movable above said measuring table and substantially parallel therewith and having at least one opening for accommodating a work piece to be measured, and further including a holder resiliently linked to the front end of said feeder plate and constructed to hold a standard specimen for moving the latter into and beyond measuring position between said measuring table and said sensing pin means.

4. An apparatus according to claim 2, wherein lifting means are provided for lifting said sensing pin means from a position of engagement with said measuring table into a chosen starting position, said lifting means being operatively connected with said feeder means for being actuated thereby just before a work piece is moved into said measuring position by said feeder means, and wherein said sensing pin means include two magnetic core portions longitudinally aligned with each other, and wherein said measuring head means include two compensation bridge circuits, each comprising a first pair of induction coils surrounding the path of a different one of said two magnetic core portions, and a second pair of induction coils, and first change-over switch means for alternatively connecting said alternating voltage generator means with the first of said bridge circuits before the start of a measuring operation and with the other one of said bridge circuits during the measuring operation, and second change-over switch means for alternatively connecting said electrical circuit means with the terminals of said first bridge circuit before the start of a measuring operation and with the terminals of said other one of said bridge circuits during the measuring operation, said first and second change-over switches being operatively connected to said feeder means for being actuated depending upon the movements thereof between said positions.

5. Apparatus as set forth in claim 4, said discriminator circuit means consisting mainly of flip-flop stages, said flip-flop stages comprising voltage dividers adjustable to set the threshold voltages of said flip-flop stages so as to correspond to the tolerance limits of the work piece dimension to be measured, said sorting means including a reset switch means for restoring the flip-flop stages to their initial position after each measurement of a test specimen.

6. Apparatus as set forth in claim 4, comprising a first amplifier at the input end of said circuit means for amplifying said output voltage of said bridge circuit means and a second amplifier between said circuit means and said discriminator circuit means and a manually operable switch for connecting when desired the output of said first amplifier directly to the input of said second amplifier.

7. Apparatus as set forth in claim 4, said measuring head means comprising an auxiliary housing, disposed in said measuring head to be slidable in the longitudinal direction thereof and accommodating said first pair of induction coils belonging to said second compensation bridge circuit.

8. Electrical measuring apparatus for calipering and sorting work pieces according to size, comprising, in combination, measuring frame means including a measuring table; measuring head means carried by said frame means opposite said measuring table and comprising sensing pin means slidable longitudinally along a predetermined path in said head means substantially perpendicularly relative to said measuring table and including at least one portion constituting a magnetic core, at least one first pair of induction coils aligned with each other in said head means and surrounding said path of said magnetic core portion, at least one second pair of induction coils separate from said first pair of coils and connected therewith to constitute a compensation bridge circuit, and an alternating voltage generator means for feeding said bridge circuit and for producing at the terminals thereof an output voltage when said bridge circuit is in unbalanced condition due to a movement of said sensing pin means relative to said first pair of coils, said output voltage being an analog value of the magnitude of such movement out of a chosen reference position in which said bridge circuit is balanced, said measuring head means including auxiliary sensing means attached to said sensing pin means and adjustable to predetermine a desired starting position of said sensing pin means relative to said measuring table; electric circuit means connected to said terminals and comprising first capacitor means for storing a first analog value of said output voltage corresponding to a chosen starting position of said sensing pin means and to a corresponding unbalance of said bridge circuit, second capacitor means for storing a second analog value of said output voltage corresponding to a displaced position of said sensing pin means caused by placing a work piece between said measuring table and said sensing pin means, third capacitor means for storing a third fixed analog value of said output voltage corresponding to a chosen reference position of said sensing pin means and corresponding to a lower tolerance limit dimension of said work piece, first switch means for connecting said first capacitor means with said compensation bridge terminals when said sensing pin means is in said starting position, second switch means for connecting said second capacitor means with said compensation bridge terminals when a work piece is in measuring position between said measuring table and said sensing pin means, and third switch means movable between a first position in which it connects said third capacitor means with an electric voltage source, control means being provided for adjusting the output voltage of said source so as to correspond as an analog value to a position of said sensing pin means corresponding to a chosen lower tolerance limit dimension of the work pieces to be measured, and a second position in which said third switch means connects said first, second and third capacitor means as a series-combination with each other so as to enable said series-combination to discharge a final output voltage which is the algebraic sum of the individual voltages stored in said first, second and third capacitor means and corresponds to the measured size of the particular work piece; and sorting means for sorting a plurality of successively measured work pieces according to size and comprising discriminator circuit means connected to said electric circuit means for being supplied with said final output voltage, sorting channels emanating from said measuring table and respectively assigned to piece sizes within, above and below a chosen tolerance range and electrically controllable gate means arranged across said channels and controlled by said discriminator circuit means in such a manner that after each measuring operation resulting in an energization of said discriminator circuit means by a final output voltage corresponding to a measured size of a particular work piece said gate means are so actuated that said particular measured work piece is permitted to enter only that one sorting channel which is assigned to receiving work pieces with a size corresponding to the magnitude of said final output voltage which actuates the respective gate means.

9. Electrical measuring apparatus for calipering and sorting work pieces according to size, comprising, in combination, measuring frame means including a measuring table and feeder means for feeding work pieces individually from a stand by position into a measuring position and from the latter position into a delivery position; measuring head means carried by said frame means opposite said measuring table and comprising sensing pin means slidable longitudinally along a predetermined path in said head means substantially perpendicularly relative to said measuring table and including at least one portin constituting a magnetic core, at least one first pair of induction coils aligned with each other in said head means and surrounding said path of said magnetic core portion, at least one second pair of induction coils separate from said first pair of coils and connected therewith to constitute a compensation bridge circuit, and an alternating voltage generator means for feeding said bridge circuit and for producing at the terminals thereof an output voltage when said bridge circuit is in unbalanced condition due to a movement of said sensing pin means relative to said first pair of coils, said output voltage being an analog value of the magnitude of such movement out of a chosen reference position in which said bridge circuit is balanced, said measuring head means including auxiliary sensing means attached to said sensing pin means and adjustable to predetermine a desired starting position of said sensing pin means relative to said measuring table; electric circuit means connected to said terminals and comprising first capacitor means for storing a first analog value of said output voltage corresponding to a chosen starting position of said sensing pin means and to a corresponding unbalance of said bridge circuit, second capacitor means for storing a second analog value of said output voltage corresponding to a displaced position of said sensing pin means caused by placing a work piece between said measuring table and said sensing pin means, third capacitor means for storing a third fixed analog value of said output voltage corresponding to a chosen reference position of said sensing pin means and corresponding to a lower tolerance limit dimension of said work piece, first switch means for connecting said first capacitor means with said compensation bridge terminals when said sensing pin means is in said starting position, second switch means for connecting said second capacitor means with said compensation bridge terminals when a work piece is in measuring position between said measuring table and said sensing pin means, and third switch means movable between a first position in which it connects said third capacitor means with an electric voltage source, control means being provided for adjusting the output voltage of said source so as to correspond as an analog value to a position of said sensing pin means corresponding to a chosen lower tolerance limit dimension of the work pieces to be measured, and a second position in which said third switch means connects said first, second and third capacitor means as a series-combination with each other so as to enable said series-combination to discharge a final output voltage which is the algebraic sum of the individual voltages stored in said first, second and third capacitor means and corresponds to the measured size of the particular work piece, said first, second and third switch means being operatively connected with said feeder means for being actuated thereby depending upon the movement thereof between said positions; and sorting means for sorting a plurality of successively measured work pieces according to size and comprising discriminator circuit means connected to said electric circuit means for being supplied with said final output voltage, sorting channels emanating from said measuring table and respectively assigned to piece sizes within, above and below a chosen tolerance range and electrically controllable gate means arranged across said channels and controlled by said discriminator circuit means in such a manner that after each measuring operation resulting in an energization of said discriminator circuit means by a final output voltage corresponding to a measured size of a particular work piece said gate means are so actuated that said particular measured work piece is permitted to enter only that one sorting channel which is assigned to receiving work pieces with a size corresponding to the magnitude of said final output voltage which actuates the respective gate means.

10. An apparatus according to claim 9, wherein the position of said measuring head means is adjustable in axial direction thereof relative to said frame means and said measuring table.

11. Apparatus as set forth in claim 9, wherein said auxiliary sensing means comprise a collar surrounding said sensing pin means and abutting against a portion of said measuring head means when said sensing pin means are in said desired starting position.

12. Apparatus as set forth in claim 9, said discriminator circuit means consisting mainly of flip-flop stages, said flip-flop stages comprising voltage dividers adjustable to set the threshold voltages of said flip-flop stages so as to correspond to the tolerance limits of the work piece dimension to be measured, said sorting means including a reset switch means for restoring the flip-flop stages to their initial position after each measurement of a test specimen, said reset switch means being mechanically coupled to said feeder means for being actuated thereby.

References Cited in the file of this patent
UNITED STATES PATENTS

| | | |
|---|---|---|
| 2,081,738 | Conover | May 25, 1937 |
| 2,437,639 | Floyd | Mar. 9, 1948 |